United States Patent
Pilavdzic et al.

(10) Patent No.: US 6,530,776 B1
(45) Date of Patent: Mar. 11, 2003

(54) METHOD AND APPARATUS OF CONNECTION TO AN ELECTRICAL FILM DEVICE

(75) Inventors: Jim Pilavdzic, Milton, VT (US); Andrew Booth, Williston, VT (US)

(73) Assignee: Husky Injection Molding Systems, Ltd., Bolton (CA)

( * ) Notice: Subject to any disclaimer, the term of this patent is extended or adjusted under 35 U.S.C. 154(b) by 38 days.

(21) Appl. No.: 09/972,166

(22) Filed: Oct. 9, 2001

(51) Int. Cl.[7] ................................. B29C 45/20
(52) U.S. Cl. .................. 425/549; 264/328.15; 425/572
(58) Field of Search ................ 425/549, 572; 264/328.15

(56) References Cited

U.S. PATENT DOCUMENTS

| | | | |
|---|---|---|---|
| 3,650,454 A | 3/1972 | Coucoulas | 228/1 |
| 3,916,518 A | 11/1975 | Jones et al. | 29/629 |
| 4,119,260 A | 10/1978 | Stöeckel | 228/111 |
| 4,532,075 A | 7/1985 | Taylor | 252/514 |
| 4,719,317 A | 1/1988 | Reynolds | 174/94 R |
| 4,978,814 A | 12/1990 | Honour | 174/130 R |
| 5,058,800 A | 10/1991 | Yoshizawa et al. | 228/180.2 |
| 5,962,813 A | 10/1999 | Shirako et al. | 174/88 R |
| 5,973,296 A | 10/1999 | Juliano et al. | 219/424 |
| 6,039,238 A | 3/2000 | Panaghe | 228/110.1 |
| 6,255,590 B1 | 7/2001 | Sato | 174/84 R |
| 6,264,766 B1 | 7/2001 | Ritter et al. | 148/525 |

OTHER PUBLICATIONS

J. Jones, et al., "Predicting the outcomes of laser thermal forming", Apr. 24, 2001, http://www.thefabricator.com/xp/Fabricator/Articles/Fabricating/Article131/Article131_pl.xml.

"Hereaus Thick Film Product Abstracts", Heraeus Cermallory Thick Film Products, Copyright 2000, http://www.4hcd.com/tfabst.html.

F. Eckart, "Welding Sensor Devices", Joining Technologies—Reference Center, Copyright2001, http://www.accu-parts.com/joiningtech/Weld_Sensor.htm.

T. Das, "Laser Forming", Joining and Thermal Processing, May 25, 2001, http://www.cmst.csiro.au/jointherm/lf.htm.

L. Jarvis, "Energy Beam Technology", Joining and Thermal Processing, Jun. 15, 2001, http://www.cmst.csiro.au/jointherm/ebt.htm.

S. Doe, "Microjoining", Joining and Thermal Processing, Jun. 15, 2001, http://www.cmst.csiro.au/jointherm/micro.htm.

Information regarding DIEMAT from the web site http://www.diemat.com.

Primary Examiner—Tim Heitbrink

(57) ABSTRACT

A method and apparatus for connection of a conductor to a thick film pad is disclosed. Pressure and frictional force are combined to produce a reliable metallurgical bond between the conductor and the thick film pad.

30 Claims, 3 Drawing Sheets

METHOD AND APPARATUS OF CONNECTION TO AN ELECTRICAL FILM DEVICE

BACKGROUND OF THE INVENTION

1. Field of the Invention

This invention relates to electrical devices that comprise film type electrical circuits. More particularly, this invention relates to a method and apparatus for the placement of an electrically conductive member, such as a wire, in electrical communication with a film device using ultrasonic welding means, and the application of this process to produce, for example, a heater.

2. Summary of the Prior Art

Various articles and methods of forming electrical connections are well known including soldering, spring loaded contact pads, welding or the use of electrically conductive epoxy adhesives. There are, however, problems in forming a suitably reliable electrical connection between a wire conductor and a terminal pad which is deposited on a substrate such as metal, steel, or ceramic, or a substrate comprising one or more metal, steel or ceramic components or layers that are placed in high temperature environments. Unfortunately, most of these well known articles and methods for attaching a wire have an upper temperature limit beyond which the original physical characteristics become unstable so that electrical connections so formed are incapable of reliably maintaining their attachment integrity over a wide temperature range.

For example, specialized solder is effective up to 280° C. at which point the solder will melt and allow the wire to disconnect from the pad. In addition, the application and processing of specialized solder is time consuming. Silver epoxy is also used but silver-loaded epoxy is effective up to 250° C. and is expensive and time consuming to process. The use of glass-loaded epoxy extends the temperature range up to 400° C. but is very expensive and time consuming also. In extremely high temperature environments, spring loaded contacts have been employed but they are very complicated, time consuming and have a limited operating life. In addition the integrity of the spring contact reduces with age due to thermal cycling and accelerated oxidation. Other more conventional methods of attachment such as an electric arc or flame-burner welding have also been employed, but these are not adaptable for thick film terminal pads on a ceramic or ceramic based or coated substrate.

U.S. Pat. No. 6,039,238 to Panaghe discloses a method of attaching a conductor to a thick film trace by applying pressure to a terminal lug that is affixed to the conductor and ultrasonically welding the terminal lug to the film trace. However, this method is problematic and does not address every installation scenario. For example, a means for applying this method to a non-flat (eg., cylindrical) substrate is not addressed or contemplated. Further, this method also requires the attachment of a terminal lug to the proximal end of the conductor/wire which can be expensive and problematic. Yet another shortcoming of this invention is the requirement that the thick film pad be substantially the same thickness as the terminal lug. This would require either the use of a very thin terminal lug or a very thick thick-film pad.

The present invention has been provided to address these well known but heretofore unsolved problems associated with the connection of a conductor directly to a thick film pad for the communication of power thereto, particularly in a high temperature environment.

SUMMARY OF THE INVENTION

There is generally provided a method and apparatus for securing a lead wire in electrical communication with a terminal pad wherein said terminal pad is a thick film trace disposed preferably on a non-flat (ie. cylindrical or the like), substrate using ultrasonic welding techniques that provides a reliable and cost effective connection means in generally high temperature environments. The proximal end of the lead wire is densified and does not require the attachment of a terminal lug and hence the strand(s) of the wire are directly attached to the film pad for reduced cost and increased reliability.

It should be noted that while the foregoing specification will discuss heaters for use with injection molding machines, the invention is not so limited, and all embodiments of the disclosed invention are fully contemplated herein.

In accordance with a first general embodiment of the present invention, an injection molding nozzle in an injection molding machine is provided comprising an elongated injection nozzle for the communication of a molten material to a mold cavity, a heater in thermal communication with said injection nozzle, said heater comprising a substrate with a resistive trace thereon and at least a pair of thick film pads, a plurality of densified electrical conductors each connected to a respective thick film pad, an ultrasonic weld connecting said each densified electrical connector to the respective thick film pad.

In accordance with another general embodiment of the present invention, a method for the attachment of an electrical conductor to a thick film pad is provided comprising the steps of providing a substrate with said thick film pad disposed thereon, densifying said conductor and placing said conductor on said thick film pad, attaching said conductor to said thick film pad by applying ultrasonic energy to one of said conductor and said thick film pad.

According to another general embodiment of the present invention, an electrical conductor (eg. wire) is affixed to a thick film pad that has been disposed on, for example, (but without limitation) a cylindrical heater for use in the injection molding of plastic resin, by an ultrasonic welding process.

The thick film pad is in electrical communication with the electrical conductor and a thick film resistive trace. The thick-film resistive trace generally generates ohmic losses when current flows therethrough. The resistive trace is preferably applied to the surface of an electrically insulative and thermally conductive substrate such that heat generated by the resistive trace is communicated to the substrate and in turn to the article to be heated. In this general embodiment, there is no terminal lug attached to the end of the conductor but rather the individual strand(s) are attached to the thick film pad.

In accordance with yet another general embodiment in accordance with the present invention, a method for the attachment of an electrical conductor to a thick film pad is provided comprising the steps of providing a non-flat substrate with said thick film pad disposed thereon, densifying said conductor and placing said conductor on said thick film pad, attaching said conductor to said thick film pad by applying ultrasonic energy to said thick film pad.

In another embodiment, a cylindrical heater is provided that is comprised of a thermally conductive substrate which is in thermal communication with a body to be heated, for example, an injection molding nozzle. The heater can be comprised of a multi-layer thick-film applied on the surface of the cylindrical substrate wherein a pair of conductors is ultrasonically welded to a respective pair of thick film pads for the application of electrical power to the heater. The conductors are preferably made from wire that has been densified at their exposed ends prior to attachment to the thick film pad.

DETAILED DESCRIPTION OF THE PREFERRED EMBODIMENTS

Figure 1:
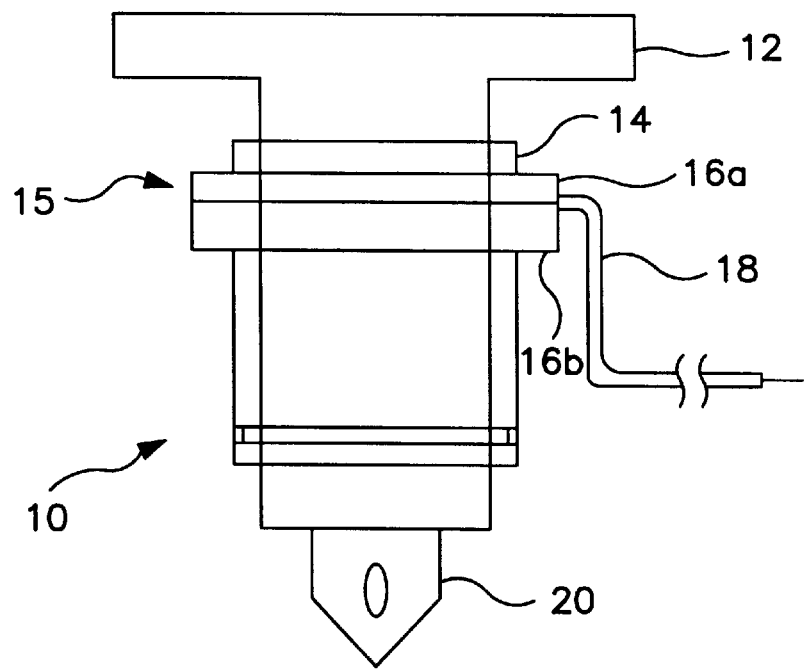
FIG. 1 is a simplified plan view of an injection molding nozzle and heater installed thereon.

The process for welding metals using ultrasonic energy is well known. The primary reason metals do not stick together is because they are covered with an oxide as a result of exposure to the atmosphere. Aluminum, for example, forms a tough oxide within microseconds when exposed to oxygen. Further complicating the joining process are normal surface contaminates such as oil or other materials. If it were not for oxides, dirt and oil, most machinery would cease to function because mating surfaces will have welded together.

Employing vibration, force and time, an ultrasonic welder forms a weld by pressing the parts to be joined together and scrubbing them against one another to break up and disperse the surface oxides and contaminates. The resultant clean base metal surfaces are held tightly together. Crystal boundaries are brought within atomic distance of one another allowing the strong attraction of atoms across the interface to create a metallurgical bond without reaching the melt temperature of the metals being joined. Since ultrasonic metal welding does not depend on achieving a melt of the metals to be joined their melt temperatures and their thermal conductivity are not process factors. The entire welding process is accomplished in well under one second.

Using ultrasonic welding to form the connection in accordance with the present invention can provide the following substantial benefits:

True metallurgical bond

Highest conductivity connection

Eliminates galvanic corrosion

No relaxation or creep due to thermal cycling or material memory

Unaffected by vibration

Welds through most oxides and surface soils

The term "thick film" is used to describe materials that are greater than about 5 microns thick. As opposed to thin film which is used to describe materials under about 5 microns thick. Thick film materials are typically applied, for example, as a paste or ink and fired using a precise thermal profile. Thick film materials can be applied, for example, using either silkscreen or direct writing technologies.

Thick film ink is a finely ground suspension containing a mix of ceramics or glass matrix with varying combinations of conductor and resistive materials. Thick film ink can be compounded to be an insulator, conductor, or resistor. There are other classes of materials used in different devices such as capacitors.

The firing temperature for thick film materials is highest for the insulating dielectric (850° C.), lower for the resistive and conductive layers (825° C.) and lowest for the final glass layer (650° C.).

The resistivity of thick film conductive and resistive materials is typically measured in the non-dimensional unit of ohms per square. Ohms per square is a measure of the resistance per area. A 1 mm×1 mm bar will have the same resistance as a 10 mm×10 mm bar but one tenth the resistance of a 1 mm wide×10 mm long bar measured across the long dimension. Conductors will typically have values of 0.01 ohms/sq. and resistive materials are 1–100K ohms/square. Resistance values can go into the megohms (10^6) or even Teraohms. Design values for heaters are in the 1–10 ohms/square range.

Many different companies formulate thick film materials. Each combination is optimized for the given application. In addition, different material systems have benefits such as firing profile, power density, noble vs. non-noble elements, ceramic or glass based.

Figure 2:
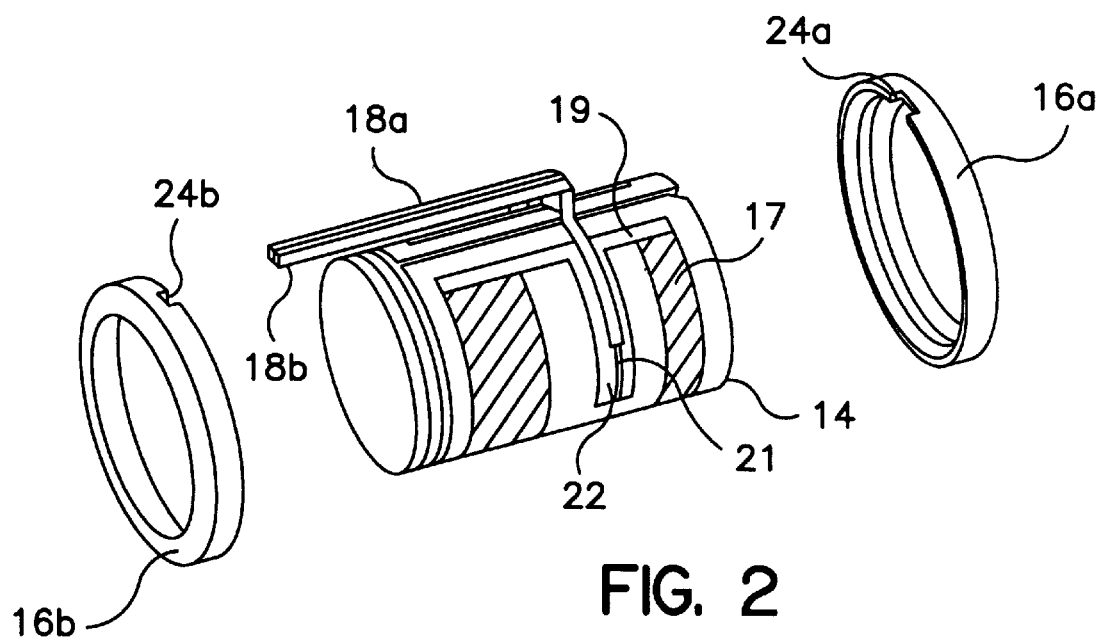
FIG. 2 is an isometric exploded view of a cylindrical heater having thick film elements thereon.

Referring first to FIGS. 1 and 2, which shows a typical plastic injection molding nozzle 10 with a cylindrical heater 14 affixed thereon in accordance with one embodiment of the present invention. In a general sense, the heater 14 is placed in thermal communication with the nozzle body 12 in any number of well known ways, to keep molten plastic flowing inside the nozzle 10 at an elevated temperature. As well known in the art, a nozzle tip 20 directs the flow of molten material to a mold cavity (not shown).

The heater 14 typically comprises a multi-layer device with a resistive or inductive trace for the generation of heat energy. At least a pair of electrical conductors 18 are in electrical communication with heater 14 for the application of electrical power. In this embodiment, an optional cover 15 comprising, for example, a first and second annular disk 16a and 16b respectively is placed around the heater 14 and protects the contact area where the conductors 18 are affixed to the heater 14. In a preferred embodiment, first and second disks 16a and 16b comprise an annular disk with facing grooves therearound which create a circular groove around the heater 14 to allow for the passage and guidance of the conductor 18.

Alternatively, the cover 15 could be replaced or used in combination with the application of an insulative coat of thick film paste over the contact area. This coating would help produce a more robust and reliable connection. It should be noted however, that one skilled in the art will quickly realize the possibility of numerous means for protecting the connection area. For example, metallic stamped parts could easily be fashioned to perform this function. The invention herein contemplates all such modifications.

To further protect and seat the wires 18a and 18b to the heater assembly, an optional potting material able to withstand elevated temperatures may be applied to the grooves in disks 16a and 16b prior to their closure around the wire. During testing, it was determined that a single part chemical-setting potting compound based on Alumina with the temp limit 2500° F. and dielectric strength 245 V/mil and volume resistivity of 10^8 ohm-cm from Aremco Products, Inc. was most suitable for this application. In this arrangement, disks 16a and 16b provide for joint encapsulation, wire strain relief and oxidation protection.

In a preferred embodiment, silver coated stranded copper wiring with appropriate high temperature electrical insulation from Bay Associates, Menlo Park, Calif., in accordance with MIL-W-16878/4, was found to be best suited for the present invention.

FIG. 2 shows a simplified exploded view of the heater 14. In this view, exposed wire 21 is attached to thick film pad 22 by ultrasonic methods which will be described in detail latter. Disposed on the surface of the heater 14 is a conductive trace 19 which is in communication with the thick film pad 22. In communication with the conductive trace 19 is a resistive trace 17 which generates most of the heat energy created by the heater 14. In a preferred embodiment, and not by limitation, the conductive trace 19 is used in combination with the resistive trace 17 for precise control of the placement of heat energy for improved control over a heating process.

In a preferred embodiment, the conductive trace 19 and resistive trace 17 are made from a glass-ceramic compound. The conductive trace 19 could be made from palladium/silver, platinum/silver, palladium/platinum/silver, silver and silver alloys, gold and gold alloys, copper and copper alloys and aluminum and Al alloys. Also a ternary conductor may be added to a paste to get a mixed/bonded conductor paste. This offers improved solder leach resistance and resistance to silver migration, which make this material particularly suitable for harsh environments. The conductive trace 19 exhibits a resistance in the range of 3–50 mOhm/sq.

The resistive trace 17 can be made from for example, Ruthenium based alloy compound and exhibits a resistance of approximately 1–100 Ohm/sq. Other oxides could also be used for resistive trace like Tin oxide that can withstand temperatures up to 800° C.

The various thick film traces could be applied to the substrate using various techniques. These techniques include screen printing, pen writing, decal application, chemical vapor deposition, photolithography, sputtering, photoimaging, photoforming, roller printing and plasma spray.

As mentioned previously, the optional cover 15 comprising for example a first and second annular disk 16a and 16b respectively can be placed around the heater 14 to protect the contact area where the conductors 18 are affixed to the heater 14. Notches 24a and 24b on annular disk 16a and 16b respectively allow the conductors 18 to exit the cover 15 for connection to a suitable power supply.

Figure 3A:
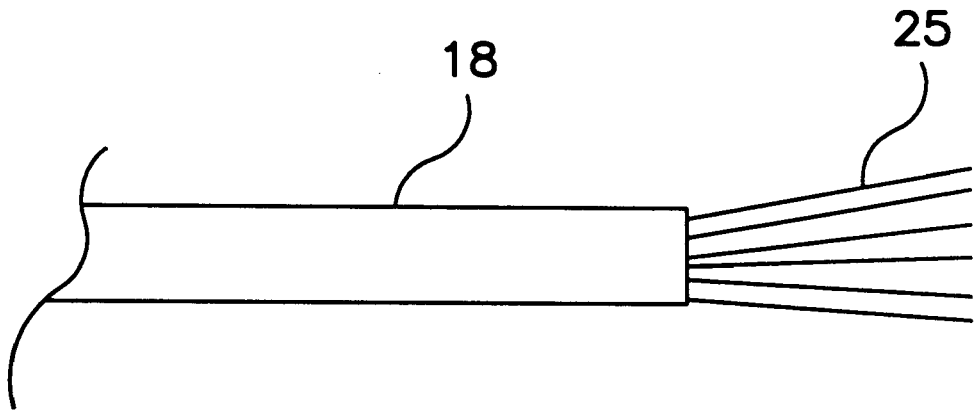
FIGS. 3a and 3b are enlarged views of a conductor wire before and after densification.
Figure 3B:
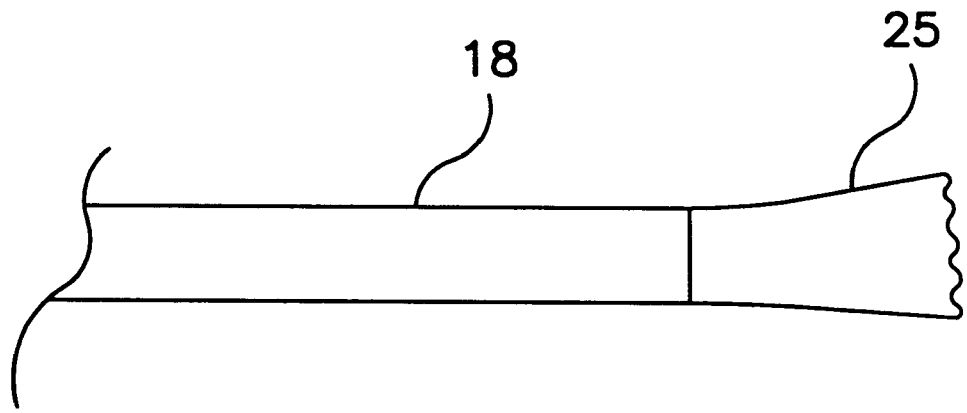

In order to reduce cost and improve reliability of the ultrasonic connection, a densification process is preferably performed on the end of the wire. FIGS. 3a and 3b shows a before and after respectively of the wire 18 and its termination 25 after being subjected to a densification process. During the densification process, the wire strands of termination 25 are placed for example, in an ultrasonic welding machine, where the individual strands are subjected to ultrasonic vibrational energy that bonds the individual strands into a single unitary piece. A Gun 40 ultrasonic welder from AMTECH Inc. was found to work well for this process. This process eliminates the need for the attachment of a separate terminal lug. Termination 25 can now be ultrasonically welded to a thick-film pad directly. It is also contemplated that the densification process be performed using a high temperature solder or brazing material that is introduced into the termination 25. For example, a high temperature silver brazing material could be used to bind the individual strands of the wire together, thereby allowing termination to be ultrasonically welded to the thick film pad.

Figure 4:
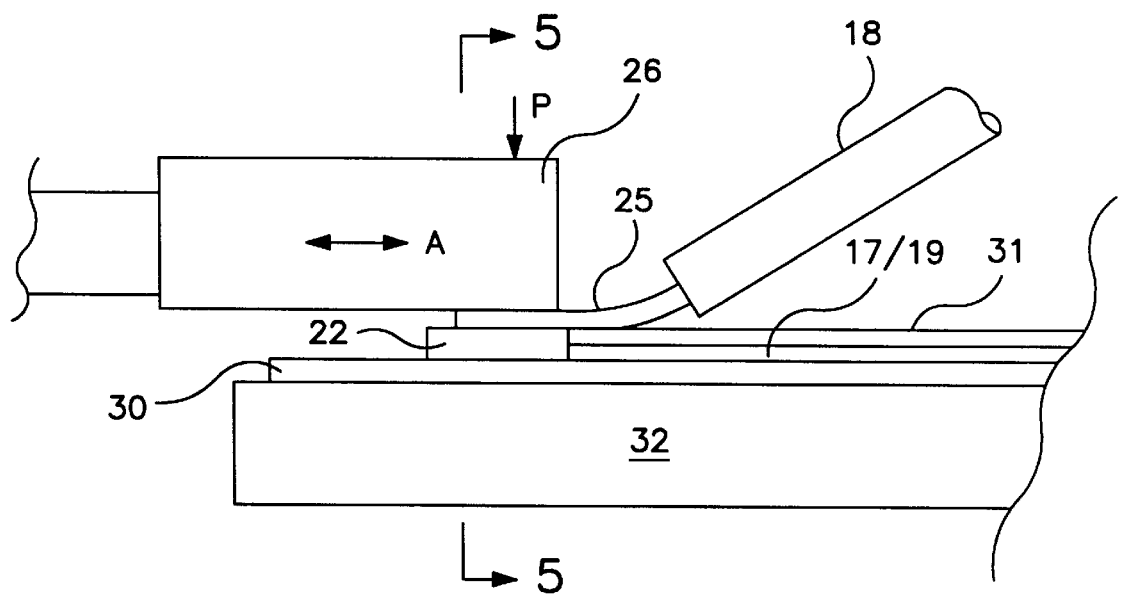
FIG. 4 is a simplified enlarged view of a thick film device installed in an ultrasonic welding apparatus.
Figure 5:
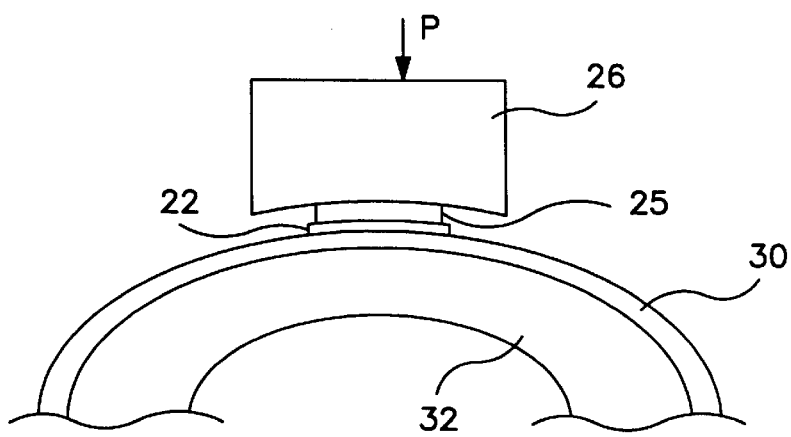
FIG. 5 is a cross-sectional enlarged view of the ultrasonic apparatus in communication with a thick film device.

Referring now to FIGS. 4 and 5 which shows a simplified schematic view of the conductor 18 being attached to the thick film pad 22 by an ultrasonic welding head 26 in accordance with one embodiment of the present invention. In these figures, substrate 32 comprises a first insulative layer 30 disposed directly on a surface of the substrate. Layer 30 is required when substrate 32 is made from an electrically conductive material like steel. If substrate 32 was made from an electrically insulative material like a ceramic or glass based alloy, layer 30 may not be required. Disposed on top of layer 30 is the conductive trace 19 and resistive trace 17.

It should be noted that both the conductive trace 19 and the resistive trace 17 are on the same level and form the active part of the heater. This layer is the active layer that makes up the heater and generates the heat. Thick film pad 22 is also on this layer and is preferably in electrical communication with the conductive trace 19 and/or resistive trace 17. An optional second insulative layer 31 can also be applied on top of the resistive trace 17 and the conductive trace 19. This second insulative layer 31 is not applied over any thick film pads 22 so that termination 25 may directly contact each pad 22.

Wire termination 25 is placed between a thick film pad 22 and the ultrasonic head 26. A predetermined force denoted by arrow P is applied to ultrasonic head 26 to maintain intimate contact between the termination 25 and the thick film pad 22. The ultrasonic head 26 is vibrated in the direction denoted by arrow A at ultrasonic frequencies between 20–50 kHz for a predetermined time to effect a bond between the termination 25 and the thick film pad 22. Testing revealed that a frequency of about 40 kHz worked best. Although not shown in the figures, the attachment of wire termination 25 to thick film pad 22 could also be accomplished by a high pressure rolling device. The rolling device would apply a pressure between the termination 25 and the thick film pad 22 while an anvil is rolled over the connection area to generate friction between the two and form a metallurgical bond therebetween. The anvil would be designed to follow the curvature of the substrate.

In a preferred embodiment it was determined that a force between 1 and 300 pounds normal to the ultrasonic bond was required to produce an acceptable bond. A force of around 150 pounds was determined to provide the most reliable results.

As shown in FIG. 5, when attaching the conductor 18 to a non-flat substrate, it may be preferable to use an ultrasonic head 26 that has a mating curved surface to ensure good contact with the termination 25 while applying the ultrasonic energy.

In a preferred embodiment, it is desirable to add a protective coating over the area where the termination 25 is connected to the thick film pad 22 to reduce oxidation at the joint. For example, a thin sheet of silver or gold foil may be ultrasonically welded to the area. In the preferred embodiment, a silver paste applied over the area was found to be the quickest and most cost effective means.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. An injection molding nozzle in an injection molding machine comprising:
   an elongated injection nozzle for the communication of a molten material to a mold cavity,
   a heater in thermal communication with said injection nozzle, said heater comprising a substrate with a resistive trace thereon and at least a pair of thick film pads, a plurality of densified electrical conductors connected to a respective thick film pad, said conductors being attached to said thick film pad by an ultrasonic weld.

2. The injection molding nozzle as in claim 1 further comprising a cover placed over said thick film pads.

3. The injection molding nozzle as in claim 2, wherein said cover is electrically insulative.

4. The injection molding nozzle as in claim 2, wherein said cover is made from a material selected from the group consisting of ceramics, glass, high temperature filled thermosets, high temperature unfilled thermosets and metal.

5. The injection molding nozzle as in claim 2, wherein said cover is comprised of two parts having facing annular grooves formed therein for receipt and guidance of said conductors when installed on said heater.

6. A heater for in an injection molding machine comprising:
   a thermally conductive substrate with a resistive element disposed thereon,
   at least two thick film pads disposed on said substrate and in electrical communication with said resistive trace,
   a densified electrical conductor attached to each thick film pad by an ultrasonic weld.

7. The heater as in claim 6 further comprising a cover placed over said thick film pads.

8. The heater as in claim 7, wherein said cover is electrically insulative.

9. The heater as in claim 7, wherein said cover is made from a material selected from the group consisting of ceramics, glass, high temperature filled thermosets, high temperature unfilled thermosets and metal.

10. The heater as in claim 7, wherein said cover is comprised of two parts having facing annular grooves formed therein for receipt and guidance of said conductors when installed on said heater.

11. The heater as in claim 10, wherein a potting material is placed in said grooves.

12. The heater as in claim 11 wherein said potting material is a ceramic based substance.

13. The heater as in claim 6, wherein said resistive element is replaced by an inductive element for the generation of heat.

14. The heater as is claim 6, further comprising a conductive element in electrical communication with at least one of said thick film pad and said resistive element, wherein said conductive element exhibits a lower electrical resistance than said resistive element.

15. The heater as in claim 6 wherein said densified electrical conductor is made by inserting a high temperature silver solder therein.

16. An injection molding nozzle in an injection molding machine comprising:
   an elongated injection nozzle means for the communication of a molten material to a mold cavity,
   a heater means in thermal communication with said injection nozzle means, said heater means comprising a substrate with a heat producing element thereon and at least a pair of thick film pads in electrical communication with said heat producing element,
   a plurality of densified electrical conductor means each connected to a respective thick film pad, an ultrasonic weld means connecting each said densified electrical conductor means to a respective thick film pad.

17. The injection molding nozzle as in claim 16 further comprising a cover means for protecting said thick film pad.

18. The injection molding nozzle as in claim 17, wherein said cover means is electrically insulative.

19. The injection molding nozzle as in claim 17, wherein said cover means is made from a material selected from the group consisting of ceramics, glass, high temperature filled thermosets, high temperature unfilled thermosets and metal.

20. The injection molding nozzle as in claim 17, wherein said cover means is comprised of two parts having facing annular groove means formed therein for receipt and guidance of said conductor means when installed on said heater means.

21. A heater in an injection molding machine comprising:
   a thermally conductive substrate means having a resistive element means for generation of heat disposed thereon,
   at least two thick film pad means disposed on said substrate means and in electrical communication with said resistive element means, densified electrical conductor means attached to each thick film pad means, said conductor means affixed to said thick film pad means by an ultrasonic weld means.

22. The heater as in claim 21 further comprising a cover means placed over said thick film pad means.

23. The heater as in claim 22, wherein said cover means is electrically insulative.

24. The heater as in claim 22, wherein said cover means is made from a material selected from the group consisting of ceramics, glass, high temperature filled thermosets, high temperature unfilled thermosets and metal.

25. The heater as in claim 22, wherein said cover means is comprised of two parts having facing annular groove means formed therein for receipt and guidance of said conductor means when installed on said heater.

26. The heater as in claim 25, wherein a potting material means is placed in said groove means.

27. The heater as in claim 26 wherein said potting material means is a ceramic based substance.

28. The heater as in claim 21, wherein said heat producing element means is comprised of an inductive element means for the generation of heat.

29. The heater as is claim 21, further comprising a conductive element means in electrical communication with at least one of said thick film pad means and said heat generating element means, wherein said conductive element means exhibits a lower electrical resistance than said heat generating element means.

30. The heater as in claim 21 wherein said densified electrical conductor means is made by inserting a high temperature silver solder therein.

* * * * *